(12) United States Patent
Wilson et al.

(10) Patent No.: US 7,774,685 B2
(45) Date of Patent: Aug. 10, 2010

(54) HDD SECTOR FORMAT WITH REDUCED VULNERABILITY TO DEFECTS AND BURST ERRORS

(75) Inventors: Bruce Wilson, San Jose, CA (US); Richard Michael Hamilton New, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1402 days.

(21) Appl. No.: 11/200,411

(22) Filed: Aug. 8, 2005
(Under 37 CFR 1.47)

(65) Prior Publication Data

US 2007/0030775 A1 Feb. 8, 2007

(51) Int. Cl.
*G11C 29/00* (2006.01)
(52) U.S. Cl. .................................. 714/768; 360/48
(58) Field of Classification Search ................ 714/768, 714/761, 762, 787, 788; 360/48
See application file for complete search history.

(56) References Cited

U.S. PATENT DOCUMENTS

| 6,181,497 | B1* | 1/2001 | Malone, Sr. ................... 360/48 |
| 6,430,233 | B1* | 8/2002 | Dillon et al. ................. 375/316 |
| 6,583,943 | B2 | 6/2003 | Malone, Sr. ................... 360/48 |
| 6,690,524 | B1 | 2/2004 | Wakefield et al. ............. 360/51 |
| 6,772,386 | B2 | 8/2004 | Iwata et al. .................. 714/755 |

OTHER PUBLICATIONS

Xu, Maximizing burst erasure correction capability of MDS codes, Conference on communication, control and computing. Monticelo, IL Oct. 2003.*

* cited by examiner

*Primary Examiner*—Sam Rizk
(74) *Attorney, Agent, or Firm*—John L. Rogitz

(57) ABSTRACT

Modified HDD sector formats have multiple sets of preamble data. The preambles are well separated so that any defect long enough to wipe out both preambles would also overwhelm the ECC.

21 Claims, 2 Drawing Sheets

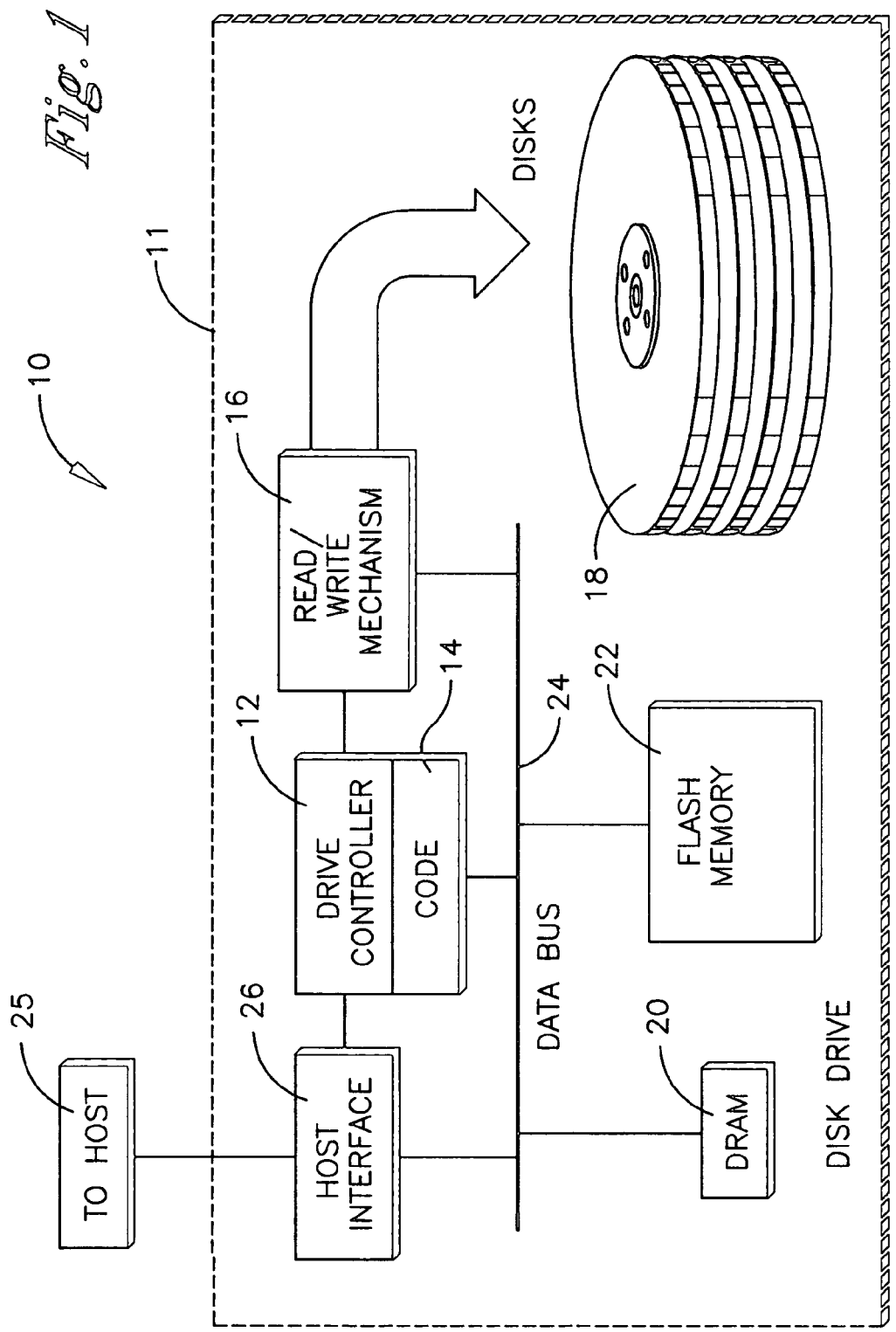

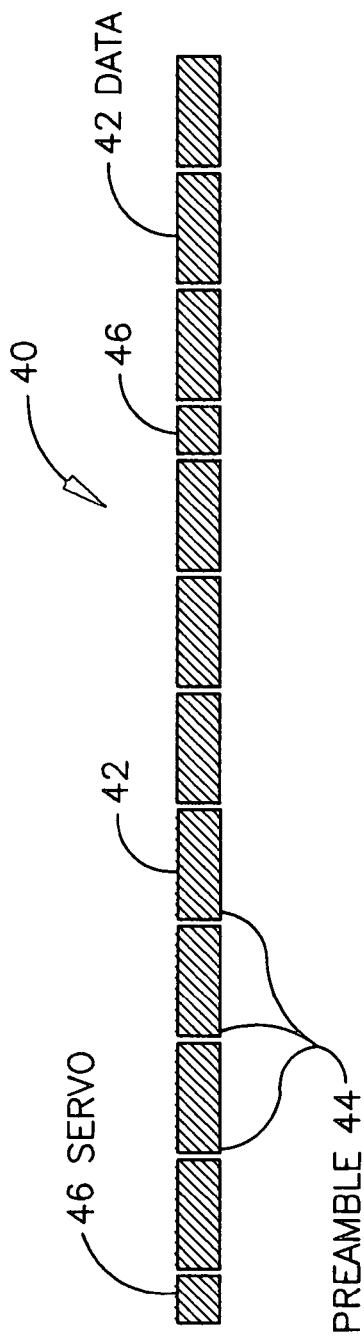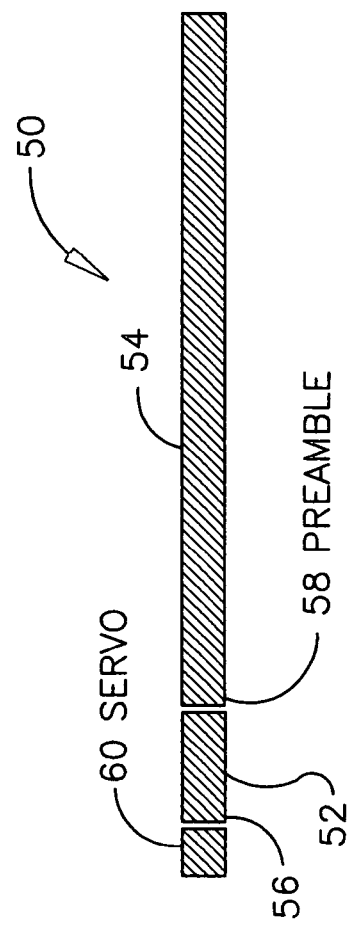

HDD SECTOR FORMAT WITH REDUCED VULNERABILITY TO DEFECTS AND BURST ERRORS

I. FIELD OF THE INVENTION

The present invention relates generally to hard disk drives (HDD).

II. BACKGROUND OF THE INVENTION

A hard error in a hard disk drive (HDD) occurs when the data in a sector cannot be recovered despite repeated attempts. Hard errors are especially important in enterprise storage applications. For example, in RAID 5 systems the most likely mechanism for data loss is that a hard drive fails followed by a subsequent hard error on one of the other (redundant) drives during the rebuild process. For this reason, hard error rate is carefully monitored during the process of qualifying a new enterprise HDD product.

Soft errors, i.e., misreads due to poor signal-to-noise ratio or disturbances in the read process, can usually be eliminated by repeated re-reads. In contrast, hard errors are usually caused by problems which are repeatable from read to read. Sources of hard errors include scratches and other media defects or disturbances (collectively, "defects"), such as a head-disk contact, occurring when the sector was written. Defects tend to produce bursts of errors which can be corrected very efficiently by the error correction code (ECC) of the HDD. As an example of the power of ECCs, in a HDD with 4 kB sector formats, bursts of errors up to almost 3200 bits in length in the data field can be corrected, assuming that almost all of the ECC redundancy bytes can be used for erasure correction as opposed to error correction.

As understood by the present invention, each data storage sector of a HDD begins with a preamble consisting of a sync field and one or two sets of sync bytes. The preamble is used in accordance with HDD principles known in the art to coordinate proper reading of the ensuing data field of the sector. Accordingly, if a defect destroys both sets of sync bytes or a large proportion of the sync field then the data in the main body of the sector cannot be read reliably. This means that a relatively small defect, if it occurs in the wrong location, i.e., in the preamble, can cause a hard error that cannot be corrected by the ECC.

As further understood herein, in present 512 B sector formats the likelihood of sector failure due to a defect compromising the preamble is less than the likelihood of sector failure due to a defect compromising the main data field to the extent that it overwhelms the capacity of the ECC to correct it. In 4 kB sector formats the ECC is more robust than in 512 byte formats, meaning that the likelihood that a defect in the main data field of a 4 kB format sector will overwhelm the ECC is much less than in a 512 byte format sector. As critically observed herein, however, the likelihood that a defect compromises the preamble beyond repair remains almost the same in both 512 byte and 4 kB formats, and thus becomes the dominant mechanism for hard errors particularly in 4 kB formats. That is, for conventional sector formats, even small bursts of errors can cause a sector to fail if the burst occurs around the sync byte at the end of the preamble.

The disclosure below refers to "burst erasure correction power". As is understood by those skilled in the art, this is an intrinsic property of an error correcting code. Error correcting codes have a fundamental parameter called minimum (Hamming) distance, which is the smallest number of symbols that must change to go from one valid codeword to another. For uncoded data the minimum distance is one since a single symbol of a codeword can be changed to arrive at another codeword, whereas for data with a parity symbol the minimum distance is two, because a data symbol of a codeword can be changed along with the parity symbol to arrive at a codeword with valid parity. The value of the minimum distance in this latter case is the number of redundant parity symbols plus one. This can be proved to be the theoretic maximum value in all cases. Codes that meet this limit are known as Maximum Distance Separable or MDS codes, one example of which are Reed-Solomon codes. In any case, a code with distance 2 T+1 can always correct T or fewer errors. Furthermore, a code with distance 2 T+1 can always reconstruct 2 T or fewer erased symbols. Regardless of how calculated, this latter characteristic, i.e., of erasure correction power, is referred to herein as "burst erasure correction power".

SUMMARY OF THE INVENTION

A method for data storage includes rendering, from a data sector, at least two segments, with each segment including a respective sync preamble. The distance in data units between the sync preambles is no greater than a burst erasure correction capability of an error correction code (ECC).

In one embodiment, two and only two segments are established, and the segments have different sizes from each other. In another embodiment, a multiple "n" of two segments are established, with each with its own respective sync preamble. Here, "n" may be one or it may be an integer greater than one. For instance, at least four segments per sector may be established. The segments may have equal sizes. If desired, segments of different data sectors may be interleaved with each other on the disk, and sector sizes may be different in different radial locations of the disk.

In another aspect, a hard disk drive includes logic rendering plural sync preambles in at least one sector having a size of 512 bytes or 4 kB such that the spacing between sync preambles is keyed to a burst erasure correction capability of an ECC executed by the HDD to recover from errors.

In still another aspect, a data storage system includes at least one data storage disk defining plural sectors, and means for rendering at least one sector into at least two segments. Each segment has a respective preamble containing sync data useful for coordinating reading of a data field of the segment. The locations of the preambles relative to each other are based at least in part on the burst erasure correction capability of the ECC.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of an illustrative non-limiting hard disk drive employing the present sector layout;

FIG. 2 is a schematic view of a data sector using a first layout scheme, referred to herein as a "Titanic" scheme; and FIG. 3 is a schematic view of a data sector using a second layout scheme.

DETAILED DESCRIPTION OF THE PREFERRED EMBODIMENT

Referring initially to FIG. 1, a hard disk drive (HDD) is shown, generally designated 10, having a housing 11 holding a hard disk drive controller 12 that can include and/or be implemented by a microcontroller. The controller 12 may access electronic data storage in a computer program device or product such as but not limited to a microcode store 14 that may be implemented by a solid state memory device. The microcode storage 14 can store microcode embodying the logic discussed further below.

The HDD controller 12 controls a read/write mechanism 16 that includes one or more heads for writing data onto one or more disks 18. Non-limiting implementations of the HDD 10 include plural heads and plural disks 18, and each head is associated with a respective read element for, among other things, reading data on the disks 18 and a respective write element for writing data onto the disks 18.

The HDD controller 12 communicates with solid state cache. In non-limiting implementations, the cache may be embodied by solid state volatile memory such as but not limited to a Dynamic Random Access Memory (DRAM) device 20, and/or by solid state non-volatile memory such as but not limited to a flash memory device 22 over an internal HDD bus 24. The HDD controller 12 also communicates with an external host computer 25 through a host interface module 26 in accordance with HDD principles known in the art. The host computer 25 can be a portable computer that can be powered by a battery, so that the HDD 10 can be a mobile HDD.

At least portions of the logic disclosed below may be contained in a code storage 14 that is separate from the HDD controller 12, or the storage 14 may be integrated into the controller 12. Or, it may be contained in the read/write mechanism 16, or on the DRAM 20 or flash memory device 22. The logic may be distributed through the components mentioned above, and may be implemented in hardware logic circuits and/or software logic circuits.

Now referring to FIG. 2, in a first embodiment a data sector 40 of the disk 18 is rendered into segments 42. The sector 40 may contain 4 kB of user data but without limitation may contain 512 bytes, 1024 bytes, or any other value. Each segment 42 includes an associated preamble 44, with a preamble including a sync field and at least one sync word. Each preamble 44 is independent of the other preambles, and each preamble 44 contains sync information useful for coordinating the reading of the data field that constitutes the remainder of the segment 42. In many cases a single data sector can be split by one or more servo sectors that occur at fixed, regularly spaced locations around the track in accordance with servo principles known in the art.

In accordance with present principles, the size of each segment 42 in data units is smaller than the burst erasure correction power of the ECC of the HDD.

In non-limiting implementations an even number of segments 42 is established for the sector 40, i.e., the number of segments into which the sector 40 is divided is 2n, wherein n is an integer selected such that the size of each segment 42 is smaller than the burst erasure correction power of the ECC and such that no partial segment is left over. The segments 42 preferably have identical sizes as each other.

Because each segment 42 has its own preamble 44, if a defect compromises the preamble the respective segment will be lost. However, if this happens the segments 42 are sufficiently small that the ECC can still recover the lost segment using erasure decoding principles known in the art. That is, an entire segment 42 may be lost but recovered by the ECC using the remaining segments 42. Furthermore, the segment size may be chosen to be small enough that some errors can be corrected in addition to one erased segment.

Additionally, the segment size may be constant in a given radial zone of the disk 18 but may be different as between different radial zones of the disk 18. The segment size in each zone, for example, can be chosen to avoid split segments. Moreover, segments 42 from different sectors 40 can be interleaved with each other on the disk 18 to further reduce vulnerability to large defects.

FIG. 3 shows a dual sync sector layout in which a sector 50, e.g., a 4 kB sector, has differently-sized first and second data segments 52, 54, each with its own respective preamble 56, 58. Servo segments 60 may be provided. In the embodiment shown in FIG. 3, the first preamble 56 includes a sync field and at least one sync byte in accordance with sync principles known in the art, but is then followed by a relatively short first segment 52 of the data that is smaller than the burst erasure correction power of the ECC, which in turn is followed by the second preamble 58, which is then followed by the remainder of the recorded data (second data segment 54). In other words, the distance in data elements between preambles 56, 58 is keyed to the burst erasure correction capability of the ECC, and more specifically is less than the burst erasure correction capability of the ECC. Accordingly, if the first preamble 56 is compromised the second preamble 58 may be used for its sync information to recover the lost data using the ECC. Any burst long enough to compromise both sync fields would also be long enough to overwhelm the ECC in any case. Thus, the minimum number of segments depends on the ECC burst erasure correction power, with more segments being used to fit an even number of segments between servo sectors which occur in fixed locations around the track.

While the particular HDD SECTOR FORMAT WITH REDUCED VULNERABILITY TO DEFECTS AND BURST ERRORS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for data storage, comprising:
   rendering, from a data sector, at least two segments each including a respective sync preamble, such that a distance in data units between the sync preambles is no greater than a burst erasure correction capability of an error correction code (ECC), wherein the burst erasure correction capability is represented by a number of redundant parity symbols "T" associated with the ECC plus one and the distance is never more than 2T+1.

2. The method of claim 1, wherein two and only two segments are established, the segments having different sizes from each other.

3. The method of claim 1, wherein a multiple "n" of two segments are established, each with its own respective sync preamble, wherein "n" is an integer greater than one.

4. The method of claim 3, wherein at least four segments per sector are established.

5. The method of claim 3, wherein at least six segments per sector are established.

6. The method of claim 4, wherein the segments have equal sizes.

7. The method of claim 1, comprising interleaving segments of different data sectors.

8. The method of claim 1, comprising establishing segment sizes at least in part based on radial location of the segments on a disk.

9. A hard disk drive, comprising: logic rendering plural sync preambles in at least one sector having a size of 512 bytes or 4 kB, the spacing between sync preambles being keyed to a burst erasure correction capability of an ECC executed by the HDD to recover from errors, wherein the sync preambles contain parity symbols and the burst erasure correction capability is represented by a number of redundant parity symbols "T" associated with the ECC plus one, the spacing never being more than 2T+1.

10. The HDD of claim 9, wherein two and only two segments are established, the segments having different sizes from each other.

11. The HDD of claim 9, wherein a multiple "n" of two segments are established, each with its own respective sync preamble, wherein "n" is an integer greater than one.

12. The HDD of claim 11, wherein at least four segments are established.

13. The HDD of claim 12, wherein the segments have equal sizes.

14. The HDD of claim 9, wherein the logic interleaves segments of different data sectors.

15. The HDD of claim 9, wherein the logic establishes segment sizes to ensure that no partial segment is established regardless of radial location of the segments on a disk.

16. A data storage system, comprising:

at least one data storage disk defining plural sectors; and means for rendering at least one sector into at least two segments, each segment having a respective preamble containing sync data, the locations of the preambles relative to each other being based at least in part on the burst erasure correction capability of the ECC such that the preambles are never separated from each other by more than 2T+1 symbols, wherein T is a number of redundant parity symbols associated with the ECC.

17. The system of claim 16, wherein the sector has a size of 4kB.

18. The system of claim 17, comprising means for interleaving segments of different data sectors.

19. The system of claim 17, comprising means for establishing sector sizes differently based on radial location of the segments on a disk.

20. The system of claim 16, wherein two and only two segments are established, the segments having different sizes from each other.

21. The system of claim 16, wherein a multiple "n" of two segments are established, each with its own respective sync preamble, wherein "n" is an integer greater than one.

* * * * *